United States Patent [19]

Terny et al.

[11] Patent Number: 4,828,788
[45] Date of Patent: May 9, 1989

[54] SUPPORT DEVICE FOR A DISCHARGE TANK ASSOCIATED WITH A SUSPENDED PUMP OF A NUCLEAR REACTOR

[75] Inventors: Philippe Terny, Fontenay aux Roses; Michel Nedelec, Mennecy, both of France

[73] Assignee: Novatome, Courbevoie, France

[21] Appl. No.: 50,441

[22] Filed: May 18, 1987

[30] Foreign Application Priority Data

May 16, 1986 [FR] France .................................. 86 07076

[51] Int. Cl.⁴ ............................................. G21C 15/24
[52] U.S. Cl. ..................................... 376/285; 376/404
[58] Field of Search ............... 376/285, 402, 403, 404, 376/406

[56] References Cited

U.S. PATENT DOCUMENTS 3,916,944  11/1975  Crawford et al. ................... 376/285

Primary Examiner—Deborah L. Kyle
Assistant Examiner—Richard W. Wendtland
Attorney, Agent, or Firm—Pollock, Vande Sande & Priddy

[57] ABSTRACT

The pump (8) comprises a vertical body (8a) and a discharge sphere (10) in its lower part. Discharge pipes (14) are connected to the sphere (10). The sphere (10) is suspended from the plating (4) of the reactor through a flexible metal strip (20). The sphere (10) is connected to the strip (20) in a region located below the region of connection between the strip (20) and the plating (4). The invention is in particular applicable to the primary pumps of fast neutron nuclear reactors of the integrated type.

5 Claims, 2 Drawing Sheets

SUPPORT DEVICE FOR A DISCHARGE TANK ASSOCIATED WITH A SUSPENDED PUMP OF A NUCLEAR REACTOR

FIELD OF THE INVENTION

The invention relates to a support device for a discharge tank of a suspended pump for circulating the coolant fluid of a nuclear reactor, and in particular a primary pump of a fast neutron nuclear reactor of the integrated type.

BACKGROUND OF THE INVENTION

Primary pumps of fast neutron nuclear reactors which are generally cooled by a liquid metal such as sodium are disposed, in the case where the reactor is of the integrated type, inside the vessel of the reactor which also encloses the core immersed in the primary liquid sodium filling the vessel. These primary pumps comprise a generally cylindrical body disposed vertically and supported in its upper part by the slab of the reactor closing the vessel. The pump body communicates, in its lower part, with a discharge tank which generally has a spherical shape. This spherical tank is connected to two discharge pipes which open, at their end opposed to the end connected to the spherical tank, onto the bed supporting the core of the reactor.

The liquid sodium which is drawn in by the pump in the region of ports extending through the case of its vertical body is discharged into the spherical tank and distributed in the discharge pipes and then re-injected under the assemblies of the core of the reactor.

The discharge sphere is rigidly fixed to the plating which is a fixed structure of the reactor resting on the bottom of the vessel and carrying the bed which acts as a support for the assemblies of the core.

Upon rapid variations in the operating conditions of the reactor, accompanied by rapid and large-amplitude variations in the temperature of the coolant fluid, and in the case of an abnormal operation of the reactor owing to an incident, which is also accompanied by large temperature variations, the discharge sphere, which is rigidly connected to the plating, is subject to considerable stresses of thermal origin. Indeed, the sphere has a tendency to move under the effect of variations in expansions accompanying the temperature variations, but it is practically immobilized by its rigid connection to the plating. High stresses result in the materials constituting the discharge sphere and the elements connected thereto.

SUMMARY OF THE INVENTION

An object of the invention is therefore to propose a support device for a discharge tank associated with a pump for circulating the coolant fluid of a nuclear reactor comprising a vertical body supported in its upper part and communicating in its lower part with the discharge tank carried by a fixed structure of the reactor and connected to discharge means opening out under the core of the reactor and symmetrically disposed relative to a vertical plane containing the axis Z-Z' of the pump, this support having a structure whereby it is possible to limit to a low value the stresses of thermal origin which are exerted on its discharge tank and elements connected thereto, in the event of rapid variations in the temperature of the coolant fluid of the reactor.

For this purpose, the support device comprises at least one substantially planar metal strip disposed vertically on the axis Z-Z' of the pump and perpendicular to the plane of symmetry of the discharge means, the tank being fixed to the strip in a region located below the region of this strip ensuring its connection with the fixed structure so as to be suspended from the fixed structure by the strip.

BRIEF DESCRIPTION OF THE DRAWINGS

In order to explain the invention, an embodiment of a pump according to the invention used for circulating primary liquid sodium in a fast neutron nuclear reactor will now be described, by way of example, with reference to the accompanying drawings.

DESCRIPTION OF PREFERRED EMBODIMENT

Figures 1, 1A:
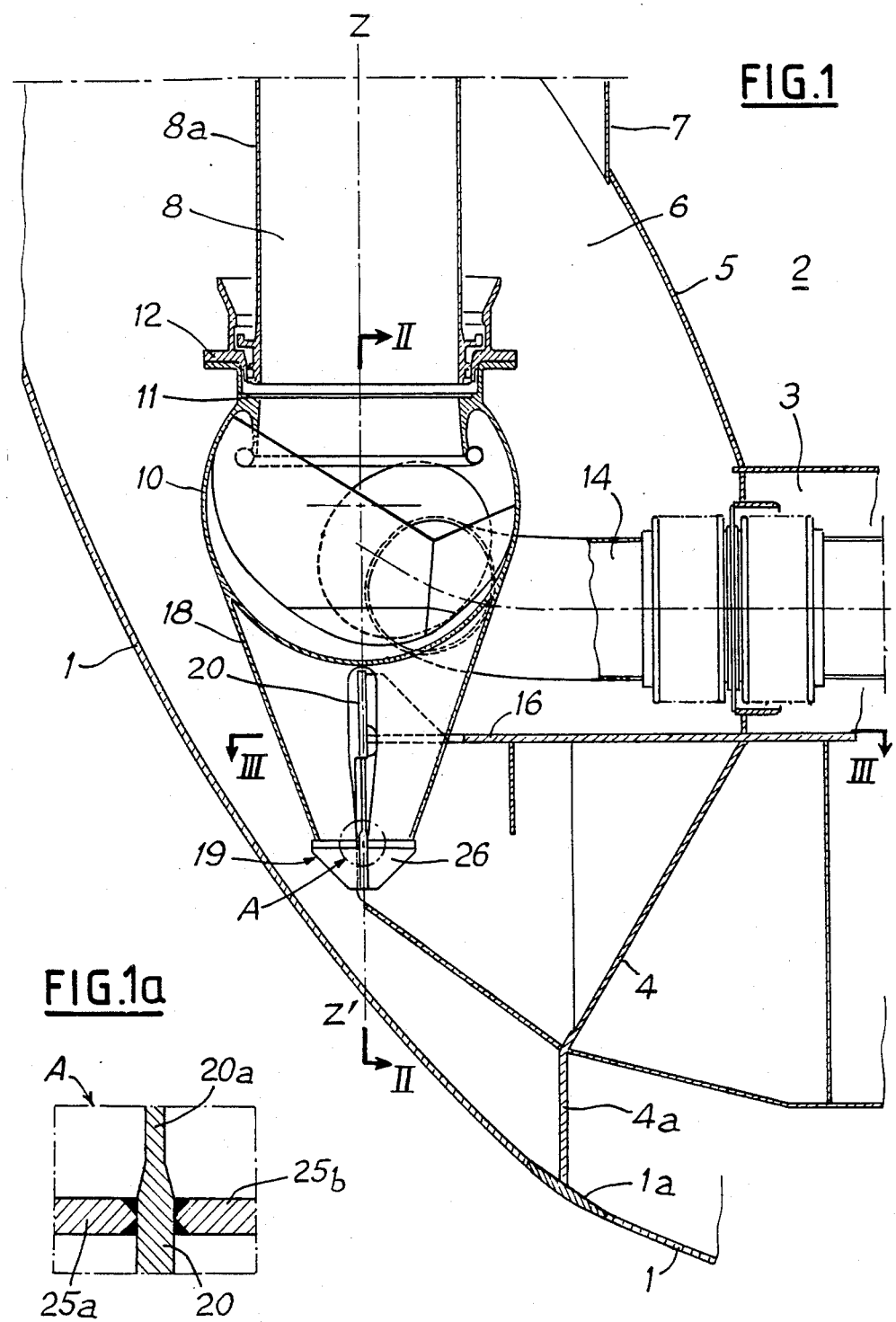
FIG. 1 is a sectional view in a vertical plane of symmetry of the lower part of the pump in its position of use inside the vessel of the reactor.
FIG. 1a is an enlarged view of the detail A of FIG. 1.

Seen in FIG. 1 is a part of the bottom of the vessel 1 of a fast neutron nuclear reactor cooled by sodium, the vessel being filled with coolant liquid sodium in which the core 2 of the reactor is immersed.

The core 2 is constituted by assemblies placed side by side and engaged by their lower part in a bed 3 bearing on a plating 4 constituted by a rigid structure of large size bearing on the bottom of the vessel 1 through a support sleeve 4a which comes in contact with a reinforced part 1a of the vessel.

The vessel 1 encloses, in addition to the bed 3 and the plating 4, internal structures, such as the wall 5 which comes to bear on the bed 3 and defines a toric region 6 inside the vessel 1; these internal structures also include cylindrical sleeves having a vertical axis such as the sleeve 7 fixed along an opening in the wall 5 and constituting a hollow shaft for the passage of a pump 8 only the lower part of which is shown in FIG. 1.

The pump 8 comprises a vertical body 8a of generally cylindrical shape placed inside the shaft 7 enclosing the active elements of the pump and including intake ports for the liquid sodium in the shaft 7.

The upper part of the body 8a of the pump, not shown in FIG. 1, extends through the horizontal slab of the reactor closing the vessel 1 and is fixed to this slab which ensures the suspension of the pump.

The region 6 defined inside the vessel 1 by the wall 5 constitutes the cold collector of the reactor in which gathers the cooled liquid sodium after passage through the intermediate heat exchangers extending into the vessel and heating the secondary liquid sodium by using the heat taken off by the primary liquid sodium in the core 2 of the reactor. The pump shaft 7 which communicates with the cold collector is also filled with cooled liquid sodium which the pump 8 re-injects at the base of the core 2.

In power fast neutron nuclear reactors at present in service or the construction of which is envisaged, the vessel encloses four indentical pumps associated with eight intermdiate heat exchangers, these elements being placed in an annular region on the periphery of the vessel.

Figure 2:
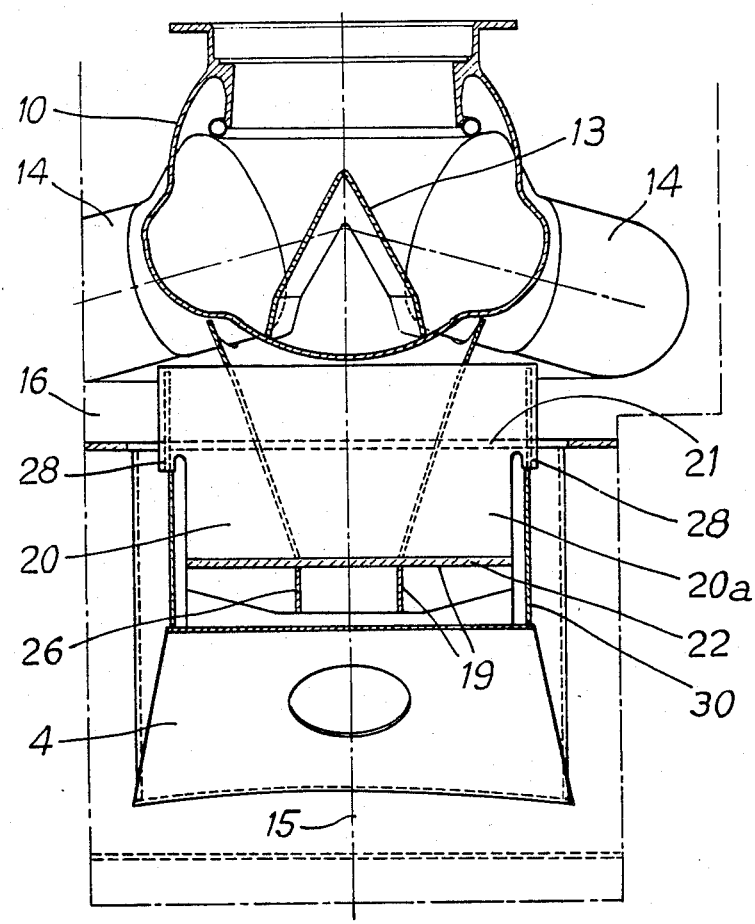
FIG. 2 is a sectional view taken on line II—II of FIG. 1.
Figure 3:
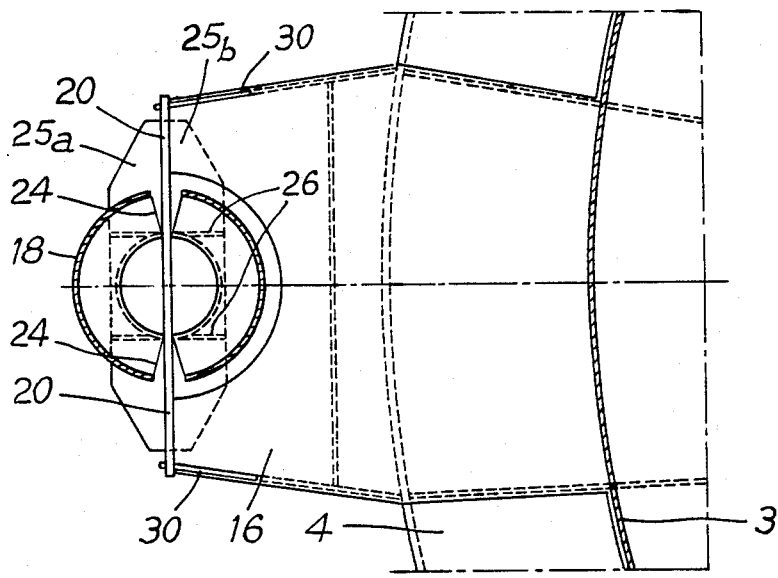
FIG. 3 is a sectional view taken on line III—III of FIG. 1.

Reference will now be made to FIGS. 1, 2 and 3 for describing the lower part of the pump 8 comprising a spherical tank, or discharge sphere 10, into which the lower part of the body 8a of the pump opens. The sphere 10 is open in its upper part in order to constitute a flange on which comes to bear a corresponding support flange 12 of the body of the pump 8.

Placed inside the sphere 10 is a separation structure 13 defining two regions in the discharge sphere into each of which opens a discharge pipe 14 through which the liquid sodium cooled by the pump will be discharged.

The two regions inside the sphere 10 and the two discharge pipes 14 are perfectly symmetrical relative to a vertical plane containing the axis Z-Z' of the pump 8. The line 15 of this plane of symmetry is seen in FIG. 2.

The discharge pipes 14 are engaged in the bed 3 and open out, at their end opposed to their end connected to the sphere 10, into this bed under the core 2. These pipes 14 therefore constitute piping supplying the core with sodium which circulates, from the bed upwardly into the assemblies of the core.

The plating 4 comprises, in a radial direction of the vessel 1, an extension 16 which extends outwardly beyond the periphery of the bed 3 supporting the core 2.

The suspension of the sphere 10 from the fixed structure of the reactor is ensured by this radial extension 16 of the plating 4.

A frusto-conical sleeve 18 is fixed by welding in the region of a connecting member to the sphere 10 along its large base. This frusto-conical sleeve 18 is also integral with a connecting structure 19 fixed along its small base. The frusto-conical sleeve 18 is so disposed that its axis is coincident with the axis Z-Z' of the pump.

A substantially planar metal strip 20 is fixed by welding, on one hand, along a horizontal region 21, to the end of the extension 16 of the plating 4 and, on the other hand, along a horizontal region 22, to the connecting structure 19.

The regions 21 and 22 extend throughout the width of the strip or plate 20, the region 22 ensuring the connection of the strip 20 to the structure 19 being disposed below the region 21 ensuring the connection of this strip 20 to the fixed structure 4. The sphere 10 is in this way suspended from the plating 4 through the strip 20.

As can be seen in FIG. 3, the sleeve 18 is open throughout the height of its lateral wall and constitutes a diametrically extending slot 24 which is upwardly divergent. The strip 20 is disposed along this slot 24 which allows movements of this strip inside the slot 24.

The connecting structure 19 comprises two horizontal plates 25a and 25b fixed by welding on each side of the strip 20 and transverse reinforcing lugs 26.

The slot 24 extends in a diametrical direction of the sleeve 18 and perpendicularly to the plane of symmetry of the discharge pipes 14, the line 15 of which is seen in FIG. 20. The fixing edge of the strip 20 to the extension 16 is such that this strip 20 is substantially vertical when the sphere 10 is not subjected to stresses of thermal origin. This strip 20 is contained in a vertical plane containing the axis Z-Z' of the pump and perpendicular to the plane of symmetry of the discharge pipes.

The strip 20 includes a lower part whose width corresponds to the length of the connecting plates 25a and 25b and an upper part which is wider and located above the connecting region 21. This wider part of the strip is terminated downwardly and upwardly by two edge portions 28 which extend outwardly beyond the lower part of the plate 20.

Two plates 30 are vertically fixed to the extension 16 of the plating 4 on each side of this extension vertically below the edge portions 28.

As can be seen in FIG. 1a, the plate 20 has a thinner part 20a whose thickness is substantially equal to one half of the thickness of the other parts of the plate. This thinner region 20a extends approximately between the junction regions 21 and 22.

Subsequent to an incident or rapid change in the operating conditions, rapid and high-amplitude variations occur in the temperature of the coolant fluid, the sphere 10 is put under stress owing to variations in expansions of the materials, principally in radial directions parallel to the plane of symmetry of the discharge pipes 14. These forces perpendicular to the plane of the strip 20 result in displacements of the sphere 10 which simply bring about a bending of the flexible strip 20 in its thinner part 20a. The assembly constituted by the discharge sphere 10, its frusto-conical connecting sleeve 18 and the discharge pipes 14 can move without producing stresses other than the bending stresses in the strip 20. The bending of the strip 20 is rendered possible owing to the movement allowed by the shape of the slots 24 provided in the suspension sleeve 18.

The strip 20 which has a large width and which is subjected to tensile stress may easily ensure the suspension of the discharge sphere whose mass is not extremely large. Further, the vertical distance between the connecting regions 21 and 22 of the strip 20 is such that, even in respect of movements of the sphere of maximum amplitude, the bending of the strip 20 remains small.

In the case of a nuclear reactor having an electric power of 1 500 MW having four primary pumps, there will be used, for example, a strip 20 of stainless steel constituted by a plate having a thickness of 40 mm thinned down in a central bending region to a thickness of 20 mm. The width of the plate 20 in its lower part is 1.60 m and the height of the thinned-down region is 0.45 m.

In the event that the plate 20, breaks as a result of repeated and non-envisaged fatigues or non-detected internal defects, the discharge sphere 10 would come to bear on the upper part of the strip 20 which bears, through the edge portions 28, on the vertical plates 30.

The principal advantages of the support device according to the invention are to permit an extremely reliable suspension, which is nonetheless flexible, of the discharge sphere constituting the lower part of this pump. In the event of rapid variations in the temperature of the coolant fluid of the reactor, the radial expansions are taken up by the bending of the plate 20 with no notable stresses being transmitted to the connection region between the discharge pipes 14 and the bed 3.

In a general way, the structures constituting the lower part of the pump or connected to this lower part are subjected to stresses of only very low value in the event of rapid variations in the temperature of the coolant fluid.

It is possible to imagine a connecting device between the sphere and the strip of a type different from a split frusto-conical sleeve, a connecting structure different from the structure 19 and a strip of a form other than that described or a plurality of strips.

Likewise, the discharge tank may have a shape different from that of a sphere and any number of pipes may be connected thereto.

The pump comprising a discharge tank suspended in an elastically yieldable manner from the fixed structure of the reactor according to the invention may be used in nuclear reactors other than fast neutron nuclear reactors cooled with liquid sodium and of the integrated type. Such a pump may be used in non-integrated reactors irrespective of the coolant fluid and, generally, in any device for circulating a thermal exchange fluid in a nuclear reactor employing a pump having a vertical body suspended by its upper part.

What is claimed is:

1. A support device for a spherical discharge tank which is combined with a pump for circulating a coolant fluid of a nuclear reactor, said pump having a vertical axis and comprising a vertical body supported in an upper part of the body and communicating in a lower part of the body with the discharge tank which is connected to discharge means which open out under a core of the reactor and which are disposed symmetrically relative to a vertical plane containing said axis, said support device comprising at least one substantially planar metal strip disposed vertically on said axis and perpendicularly to said plane of symmetry of said discharge means, said strip being fixed in a first region of said strip to a fixed structure of the reactor, said tank being extended downwardly by a support part, a sleeve having a frusto-conical wall extending downwardly from said spherical tank axially of said pump and including in said wall a diametrical slot in which said strip is disposed with a clearance so as to be laterally movable relative to said sleeve, said frusto-conial sleeve being connected to the tank by a large base of said sleeve and a connecting device which is fixed to a small base of said sleeve connecting said small base of said sleeve to said strip and fixed to said strip through said support part in a second region of said strip located below said first region of said strip so as to be suspended from said fixed structure by said strip and displaceable relative to said fixed structure in a direction perpendicular to the strip through bending of said strip.

2. A support device according to claim 1, wherein said connecting device comprises two planar plates welded to said frusto-conical sleeve and to said strip and transverse reinforcing elements perpendicular to said plates.

3. A support device according to claim 1, wherein said strip has a thinned-down portion extending on a given height of said strip in a substantially central part of said strip between said first and second regions.

4. A support device according to claim 1, further comprising supports disposed in a vertically extending position on said fixed structure, said strip having two lateral edge portions located in an upper part of said strip and each disposed above and, bearing on a respective one of said vertical supports to support said discharge tank in the event of fracture of said strip.

5. A support device according to claim 1, for a fast neutron nuclear reactor of the integratd type comprising a vessel and a plating bearing on the bottom of said vessel and supporting a bed on which bed the core of the reactor bears, said strip being fixed by welding in said upper region to a radial extension of said plating which projects outwardly of said bed.

* * * * *